United States Patent
Kishi

(10) Patent No.: US 9,578,229 B2
(45) Date of Patent: Feb. 21, 2017

(54) IMAGING APPARATUS AND METHOD FOR CONTROLLING SAME

(71) Applicant: CANON KABUSHIKI KAISHA, Tokyo (JP)

(72) Inventor: Takafumi Kishi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/146,774

(22) Filed: Jan. 3, 2014

(65) Prior Publication Data

US 2014/0192248 A1 Jul. 10, 2014

(30) Foreign Application Priority Data

Jan. 7, 2013 (JP) ................................. 2013-000441
Oct. 29, 2013 (JP) ................................. 2013-224217

(51) Int. Cl.
*H04N 5/232* (2006.01)
*H04N 5/3745* (2011.01)
*H04N 9/04* (2006.01)
*H04N 5/369* (2011.01)

(52) U.S. Cl.
CPC ....... *H04N 5/23212* (2013.01); *H04N 5/3696* (2013.01); *H04N 5/37457* (2013.01); *H04N 9/045* (2013.01)

(58) Field of Classification Search
CPC ................................................. H04N 5/23212
USPC .......................................................... 348/345
See application file for complete search history.

(56) References Cited

U.S. PATENT DOCUMENTS

| | | | |
|---|---|---|---|
| 9,030,596 B2* | 5/2015 | Shoda | H04N 5/23212 348/222.1 |
| 2011/0109776 A1* | 5/2011 | Kawai | H01L 27/14625 348/273 |
| 2011/0199506 A1* | 8/2011 | Takamiya | 348/222.1 |

FOREIGN PATENT DOCUMENTS

| | | |
|---|---|---|
| EP | 1085751 B1 | 11/2012 |
| JP | 2000-292686 A | 10/2000 |
| JP | 2001-083407 A | 3/2001 |

* cited by examiner

*Primary Examiner* — Christopher K Peterson
(74) *Attorney, Agent, or Firm* — Fitzpatrick, Cella, Harper & Scinto

(57) ABSTRACT

An imaging apparatus includes an imaging element including a pixel portion having a plurality of photoelectric conversion units with respect to one micro lens and color filters which are regularly arranged for each micro lens. The imaging apparatus generates a first signal and a second signal for phase difference-type focus detection based on an output of the imaging element. Each of the first signal and the second signal consists of a plurality of unit signals, and the unit signal of each of the first signal and the second signal is a signal obtained by mixing image signals from the same combination of the color filters.

10 Claims, 11 Drawing Sheets

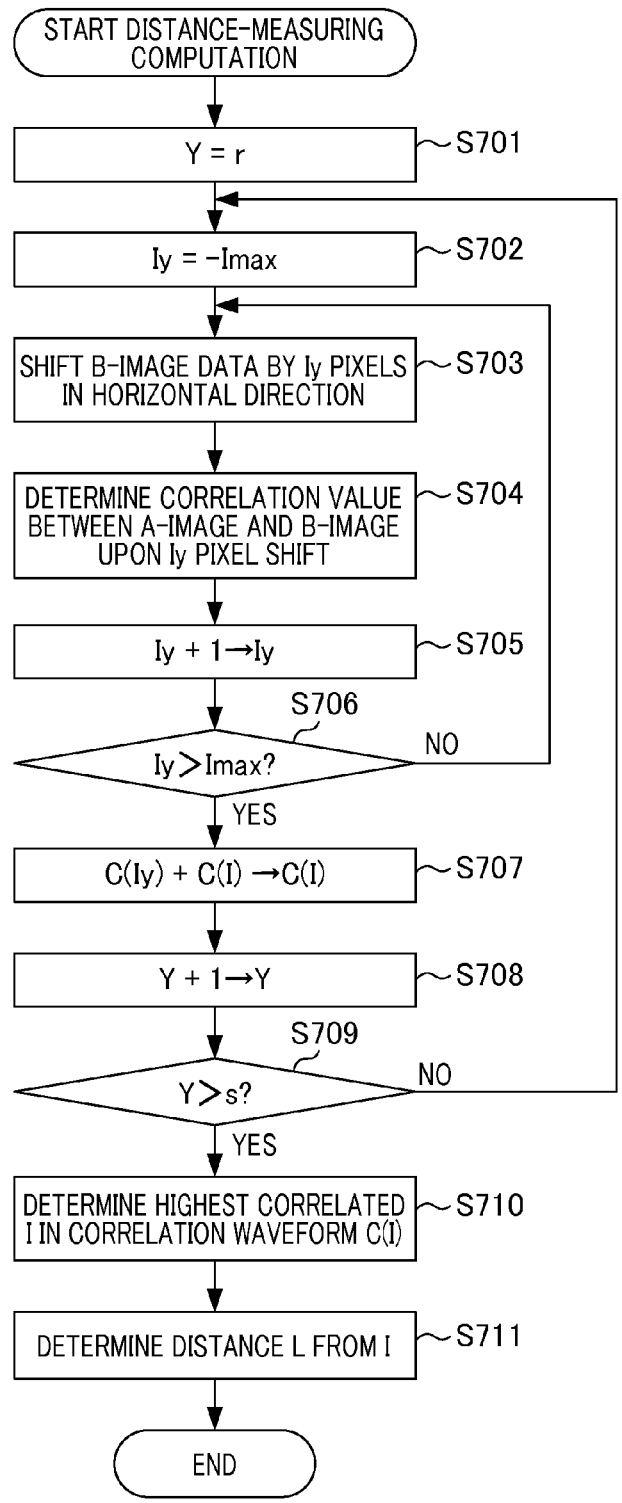

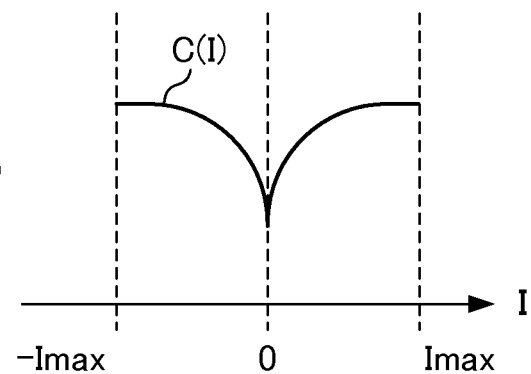
FIG. 8A FOCUSED STATE
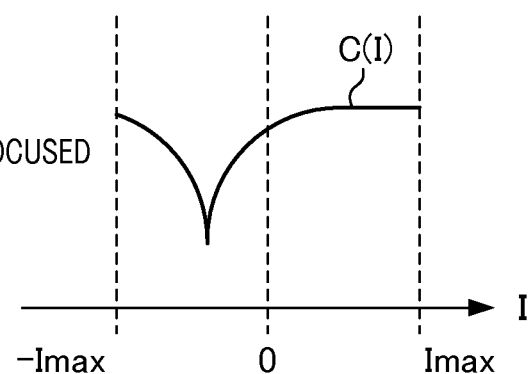
FIG. 8B FRONT-FOCUSED STATE
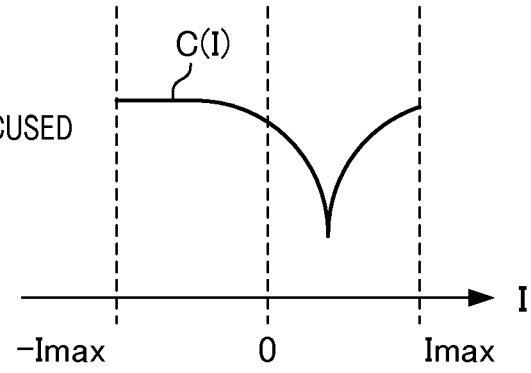
FIG. 8C REAR-FOCUSED STATE

IMAGING APPARATUS AND METHOD FOR CONTROLLING SAME

BACKGROUND OF THE INVENTION

Field of the Invention

The present invention relates to an imaging apparatus and a method for controlling the same.

Description of the Related Art

As a focus detection method for controlling the focusing of an imaging apparatus, there is a technique that performs phase difference-type focus detection simultaneously with imaging by applying a configuration such that a pixel in an imaging element receives light from a different pupil plane of an imaging lens.

Japanese Patent Laid-Open No. 2001-083407 discloses an imaging apparatus in which a light-collecting photodiode (hereinafter referred to as "PD") is divided into a plurality of PDs under one micro lens and each of the PDs receives light from a different pupil plane of an imaging lens. The imaging apparatus compares outputs from the two PDs to thereby perform focus detection. The imaging apparatus disclosed in Japanese Patent Laid-Open No. 2001-083407 performs focus detection using the output of an imaging element for imaging an image. Thus, when the imaging apparatus is applied to a typical color camera or the like, each pixel of the imaging element has a color filter. In this case, a color signal which is different for each arrangement of color filters is obtained as a focus detection signal.

Here, there has been proposed a technique that performs focus detection using an output signal from an imaging element in which a color filter is provided for each pixel. Japanese Patent Laid-Open No. 2000-292686 discloses an imaging apparatus that includes an imaging element having pixel portions in which a color filter is provided for each phase-difference detection pixel and performs phase difference detection using an output signal from the pixel portion.

However, the imaging apparatus disclosed in Japanese Patent Laid-Open No. 2000-292686 calculates a focus detection signal by using focus detection data from a blue filter and a green filter, separately, which are adjacent in the horizontal direction to thereby average the calculation result. In the method, calculation needs to be performed for each color filter, resulting in an undesirable increase in the amount of calculation for focus detection.

In addition, the imaging apparatus disclosed in Japanese Patent Laid-Open No. 2000-292686 has an output line in only one row as the output line of a focus detection signal. Thus, in the imaging apparatus, when the output line of a focus detection signal is set in plural and focus detection signal calculation processing is performed in the vertical direction in the same manner as that in the horizontal direction, the amount of calculation further undesirably increases. Furthermore, in the imaging apparatus, a color filter of the same color is arranged in every second pixel, so that the amount of data for focus detection reduces, resulting in a decrease in focus detection performance.

SUMMARY OF THE INVENTION

The present invention provides an imaging apparatus that performs phase difference detection-type focus detection using a signal output from an imaging element including pixel portions having color filters and performs focus detection with accuracy while suppressing an increase in the amount of calculation for focus detection.

According to an aspect of the present invention, an imaging apparatus is provided that includes an imaging element including pixel portions each having a plurality of photoelectric conversion units with respect to one micro lens and color filters which are regularly arranged for each micro lens; and a generating unit configured to generate a first signal and a second signal for phase difference-type focus detection based on the output of the imaging element, wherein each of the first signal and the second signal consists of a plurality of unit signals, and the unit signal of each of the first signal and the second signal is a signal obtained by mixing image signals from the same combination of the color filters.

According to the present invention, an imaging apparatus that performs phase difference detection-type focus detection using a signal output from an imaging element including pixel portions having color filters and performs focus detection with accuracy while suppressing an increase in the amount of calculation for focus detection may be provided.

Further features of the present invention will become apparent from the following description of exemplary embodiments with reference to the attached drawings.

BRIEF DESCRIPTION OF THE DRAWINGS

FIG. 7 is a flowchart illustrating an example of focus detection calculation processing.

FIGS. 8A to 8C are diagrams illustrating the relationships between a correlation waveform and focus.

DESCRIPTION OF THE EMBODIMENTS

Figure 1:
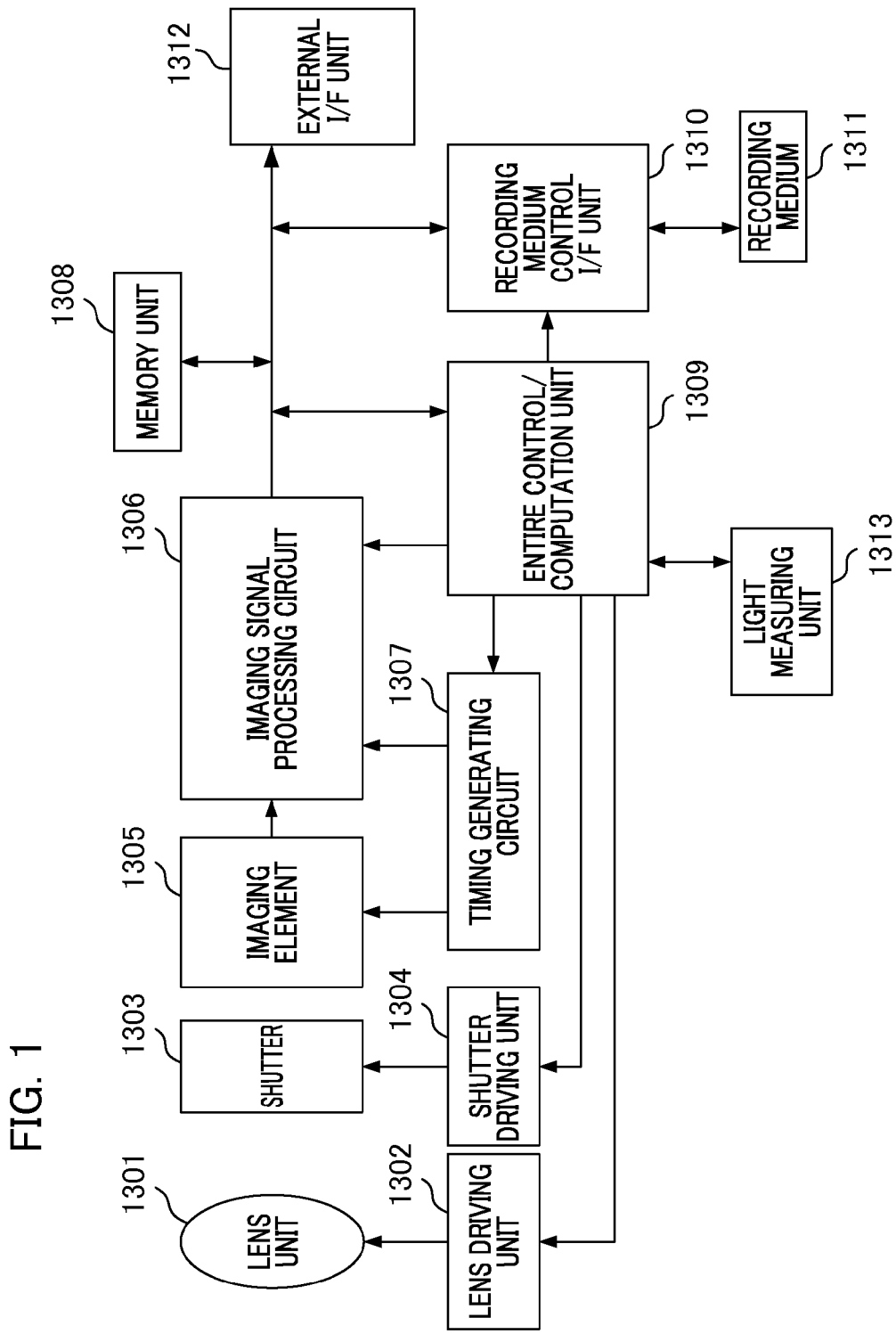
FIG. 1 is a diagram illustrating an exemplary configuration of an imaging apparatus according to the present embodiment.

FIG. 1 is a diagram illustrating an exemplary configuration of an imaging apparatus according to the present embodiment. In FIG. 1, a description will be given by taking an example of a digital camera as the imaging apparatus. Among the components provided in the imaging apparatus shown in FIG. 1, a lens unit 1301 focuses the optical image of an object on an imaging element 1305. A lens driving unit 1302 performs zoom control, focus control, aperture control, and the like. A mechanical shutter 1303 is controlled by a shutter driving unit 1304. The imaging element 1305 captures the object imaged by the lens unit 1301 as an image signal. An imaging signal processing circuit 1306 performs various types of correction for an image signal output from the imaging element 1305 or data compression.

A timing generating circuit 1307 is a driving unit that outputs various types of timing signals to the imaging element 1305 and the imaging signal processing circuit 1306. An entire control/calculation unit 1309 controls the entire imaging apparatus. A memory 1308 is a storage unit that temporarily stores image data.

An interface 1310 records or reads out image data in/from a recording medium. A recording medium 1311 records or reads out image data. The recording medium 1311 is a removable storage unit such as a semiconductor memory or the like. A display unit 1312 displays various types of information and a captured image. A light measuring unit 1313 executes light measurement processing.

Next, a description will be given of the operation of the imaging apparatus shown in FIG. 1 upon shooting. When the main power supply is turned on, the power supply for the control system is turned on and the power supply for an imaging system circuit such as the imaging signal processing circuit 1306 or the like is further turned on.

Next, when a release button (not shown) is pressed, the imaging apparatus performs calculation for focus detection based on data from the imaging element to thereby perform focus detection. Calculation for focus detection may be performed by the imaging signal processing circuit 1306 or may also be performed by the entire control/calculation unit 1309. Then, the imaging apparatus causes the lens driving unit 1302 to drive the lens unit to determine whether or not focusing is achieved. When the imaging apparatus determines that focusing is not achieved, the imaging apparatus causes the lens driving unit 1302 to drive the lens unit again to perform calculation for focus detection.

After the completion of focusing is confirmed, the imaging operation starts. When the imaging operation ends, the image signal output from the imaging element 1305 is subject to image processing by the imaging signal processing circuit 1306, and is written in a memory by the entire control/calculation unit 1309. The imaging signal processing circuit 1306 performs rearrangement processing, summation processing, and its selection processing. Data accumulated in the memory 1308 is recorded in the recording medium 1311 via the recording medium control I/F unit 1310 under the control of the entire control/calculation unit 1309.

Also, when the imaging operation is continuously performed as a video mode, the imaging apparatus performs calculation for focus detection as needed based on the image signal output from the imaging element 1305, and continuously performs image processing by the imaging signal processing circuit 1306 while moving the lens unit until focusing is achieved. The imaging apparatus may also process an image by directly inputting the image to a computer or the like via an external I/F unit 1312.

Figure 2A:
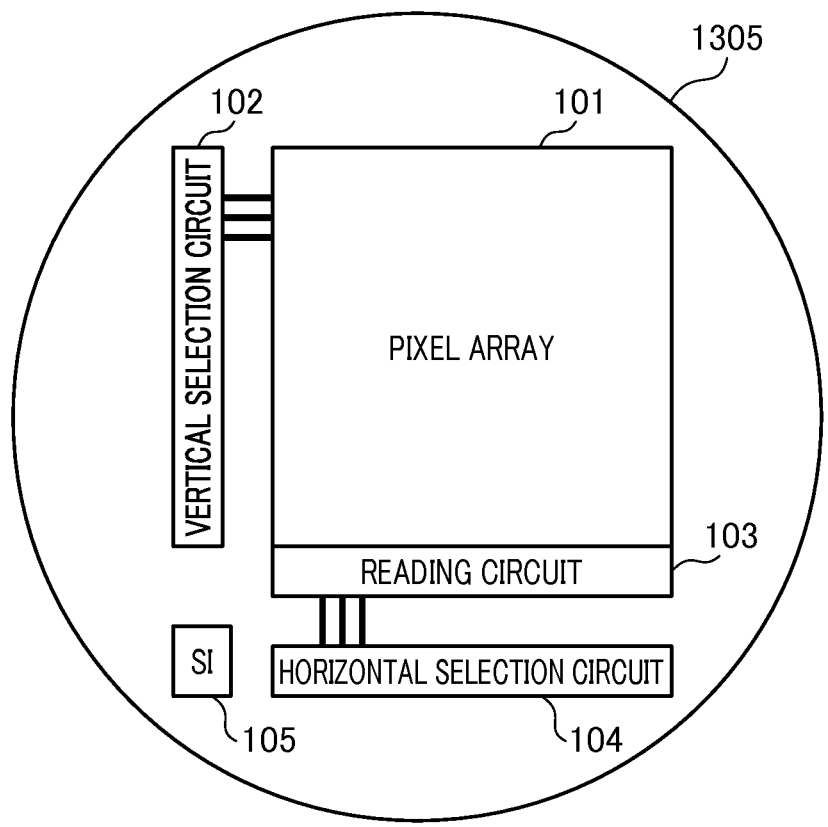
FIGS. 2A and 2B are diagrams schematically illustrating exemplary configurations of an imaging element.
Figure 2B:
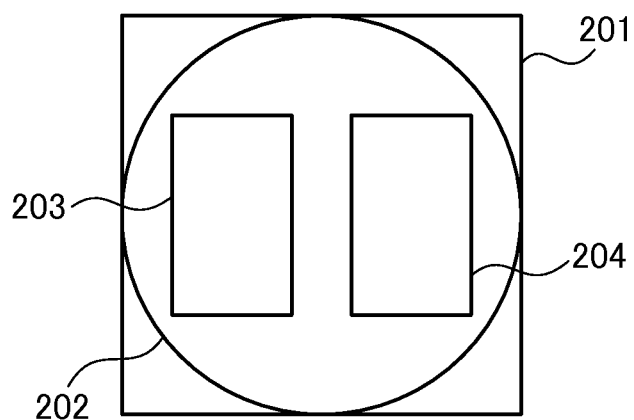

FIGS. 2A and 2B are diagrams schematically illustrating exemplary configurations of an imaging element which is applied to the imaging apparatus of the present embodiment. FIG. 2A is a diagram illustrating the general configuration of an imaging element. The imaging element 1305 includes a pixel array 101, a vertical selection circuit 102 that selects a row in the pixel array 101, and a horizontal selection circuit 104 that selects a column in the pixel array 101. A reading-out circuit 103 reads a signal of a pixel portion selected from among the pixel portions in the pixel array 101 by the vertical selection circuit 102. The reading-out circuit 103 has a memory for accumulating signals, a gain amplifier, an A (Analog)/D (Digital) converter, or the like for each column.

A serial interface (SI) unit 105 determines the operation mode of each circuit in accordance with the instructions given by the entire control/calculation unit 1309, the timing generating circuit 1307, and the like. The vertical selection circuit 102 sequentially selects a plurality of rows of the pixel array 101 so that a pixel signal(s) is extracted to the reading-out circuit 103. Also, the horizontal selection circuit 104 sequentially selects a plurality of pixel signals read by the reading-out circuit 103 for each column. The operation of the vertical selection circuit 102 and the horizontal selection circuit 104 is changed as appropriate so that the specific region can be read out. Note that the imaging element 1305 includes a timing generator that provides a timing signal to the vertical selection circuit 102, the horizontal selection circuit 104, the reading-out circuit 103, and the like, a control circuit, and the like in addition to the components shown in FIGS. 2A and 2B, but no detailed description thereof will be given.

FIG. 2B is a diagram illustrating an exemplary configuration of a pixel portion of the imaging element 1305. A pixel portion 201 shown in FIG. 2B has a microlens 202 serving as an optical element and a plurality of photodiodes (hereinafter abbreviated as "PD") 203 and 204 serving as light receiving elements. The PD functions as a photoelectric conversion unit that receives a light flux and photoelectrically converts the light flux to thereby generate an image signal. Although, in the example shown in FIG. 2B, the number of PDs provided in one pixel portion is two, the number of PDs may be any number of two or more. Note that the pixel portion also includes a pixel amplifier for reading a PD signal to the reading-out circuit 103, a selection switch for selecting a row, a reset switch for resetting a PD signal, and the like in addition to the components shown in FIG. 2B.

The PD 203 photoelectrically converts the received light flux to thereby output a left image signal. The PD 204 photoelectrically converts the received light flux to thereby output a right image signal. In other words, among a plurality of PDs included in one pixel portion, an image signal output by the right-side PD is a right image signal and an image signal output by the left-side PD is a left image signal.

Image data corresponding to a left image signal functions as image data for left eye which is viewed by a user with his left eye. Also, image data corresponding to a right image signal functions as image data for right eye which is viewed by a user with his right eye. When the imaging apparatus is configured to cause a user to view image data for left eye with his left eye and views image data for right eye with his left eye, the user can view a stereoscopic image.

FIG. 3 is a diagram illustrating an exemplary pixel array. As shown in FIG. 3, the pixel array 101 is arranged in a two-dimensional plural array of "N" pixel portions in the horizontal direction and "M" pixel portions in the vertical direction to provide a two-dimensional image.

Figure 3A:
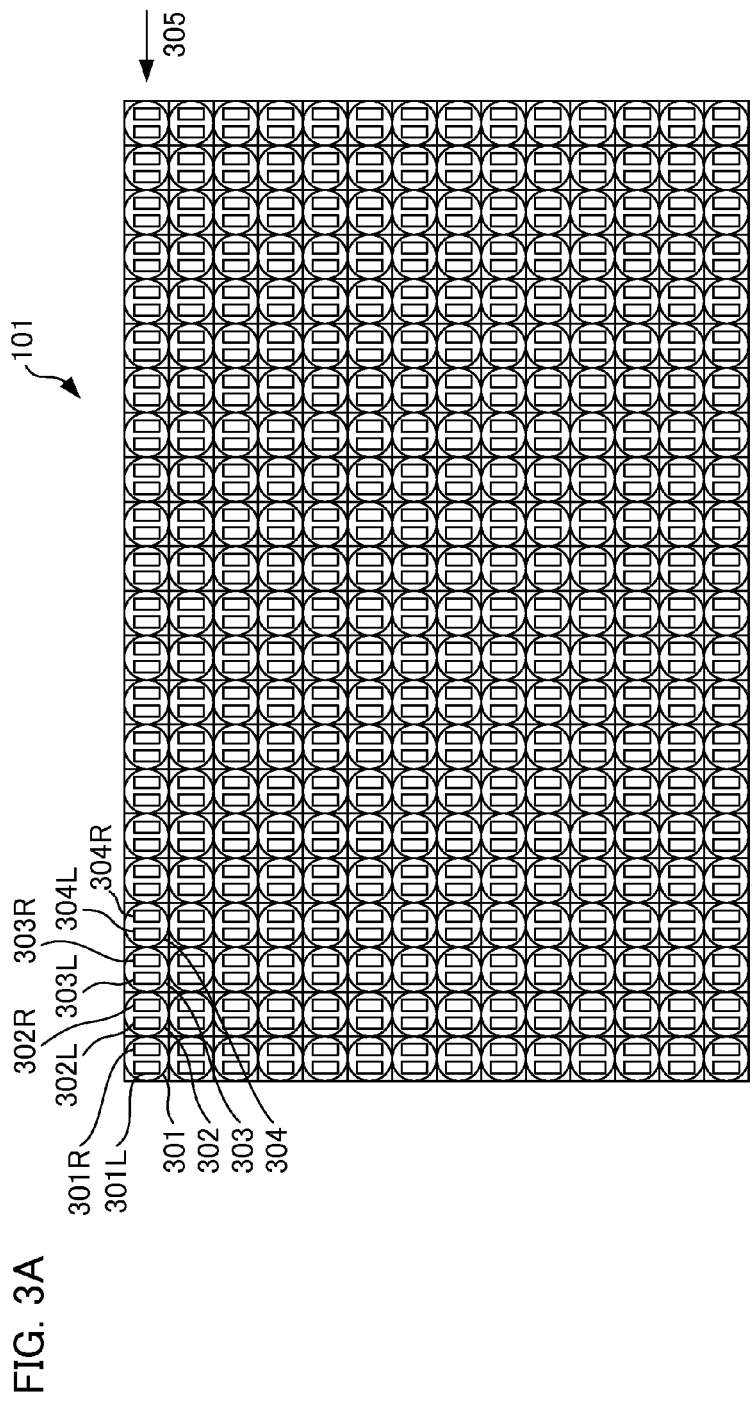
FIGS. 3A and 3B are diagrams illustrating exemplary pixel arrays.
Figure 3B:
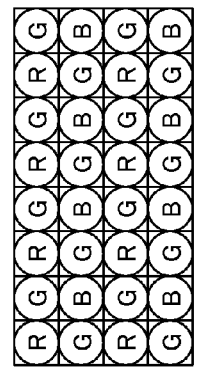

In FIG. 3A, reference numerals 301, 302, 303, and 304 are pixel portions. Each of reference numerals 301L, 302L, 303L, and 304L corresponds to the PD 203 shown in FIG. 2B. Each of reference numerals 301R, 302R, 303R, and 304R corresponds to the PD 204 shown in FIG. 2B. Each of these pixel portions has a color filter as shown in FIG. 3B. In this example, an odd row is a repetition of a red (R) and a green (G) color filters, and an even row is a repetition of a green (G) and a blue (B) color filters. In other words, the pixel portions provided in the pixel array 101 are regularly arranged in a predetermined pixel array (in this example, Bayer array). Since a color filter is provided for each pixel portion, an identical color filter is provided for two PDs within the same pixel portion.

In the example shown in FIG. 3B, the pixel array 101 has color filters which are arranged in an ordered array in a matrix of two rows and two columns of R, G, and B color filters, but the present invention is not limited thereto. For example, the pixel array 101 may have a color filter arrangement of a complimentary color system such as cyan, magenta, yellow, and the like or may also have an ordered array such as an arrangement of color filters in a matrix of three rows and two columns, an arrangement of color filters in a matrix of three rows and three columns, a staggered arrangement of color filters, or the like.

Figure 4:
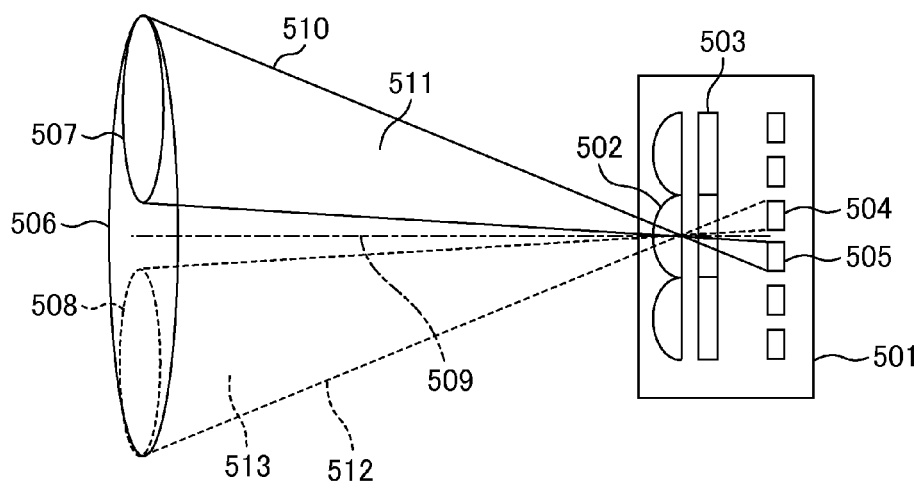
FIG. 4 is a conceptual diagram illustrating how a light flux emitted from the exit pupil of a photographing lens enters an imaging element.

Next, a description will be given of the light receiving of an imaging element having the pixel configuration shown in FIG. 3. FIG. 4 is a conceptual diagram illustrating how a light flux emitted from the exit pupil of a photographing lens enters an imaging element. Reference numeral 501 denotes the cross-section of three pixel arrays. Each pixel array has a micro lens 502, a color filter 503, and PDs 504 and 505. The microlens 502 corresponds to the microlens 202 shown in FIG. 2B.

Reference numeral 506 denotes the exit pupil of a photographing lens. In this example, the center axis of the light flux emitted from an exit pupil 506 to a pixel portion having the micro lens 502 is defined as an optical axis 509. Light emitted from the exit pupil 506 enters the imaging element 1305 about the optical axis 509. Each of reference numerals 507 and 508 denotes the partial region of the exit pupil of the photographing lens. The partial regions 507 and 508 are the different divided regions of the exit pupil of an imaging optical system.

Light beams 510 and 511 are the outermost peripheral light beams of light passing through the partial region 507. Light beams 512 and 513 are the outermost peripheral light beams of light passing through the partial region 508. Among the light fluxes emitted from the exit pupil, the upper light flux enters the PD 505 and the lower light flux enters the PD 504 with the optical axis 509 as the boundary. In other words, each of the PDs 504 and 505 has properties of receiving light emitted from different regions of the exit pupil of the photographing lens.

The imaging apparatus can acquire at least two images with a parallax by making use of such properties. For example, the imaging apparatus acquires a left image signal obtained from a plurality of left-side PDs and a right image signal obtained from a plurality of right-side PDs as a first line and a second line, respectively, in a region in a pixel portion. Then, the imaging apparatus detects a phase difference between these two image signals to thereby realize a phase difference AF (Auto Focus).

From the above description, the imaging element 1305 is an imaging element in which a plurality of pixel portions each having a plurality of PDs which generate an image signal by photoelectrically converting light fluxes having passed through different regions of the exit pupil of an imaging optical system with respect to one micro lens are arranged in the horizontal direction and in the vertical direction.

In the example shown in FIG. 2B and FIG. 4, two PDs are provided for one microlens, but the present invention is not limited to the above configuration. The phase difference detection can also be performed by the configuration in which a certain pixel portion is provided with a PD on one side and a pixel portion adjacent thereto is provided with a PD on the opposite side. The phase difference detection can further be performed by the configuration in which light coming from the one side of a microlens is shielded by a light-shielding layer or the like. In other words, pixel portions to which the present invention is applied is not limited to the aforementioned configuration as long as the pixel portions are arranged in a two-dimensional array such that information about light fluxes emitted from an exit pupil of a photographing lens can be separately acquired by an imaging element.

Figure 5:
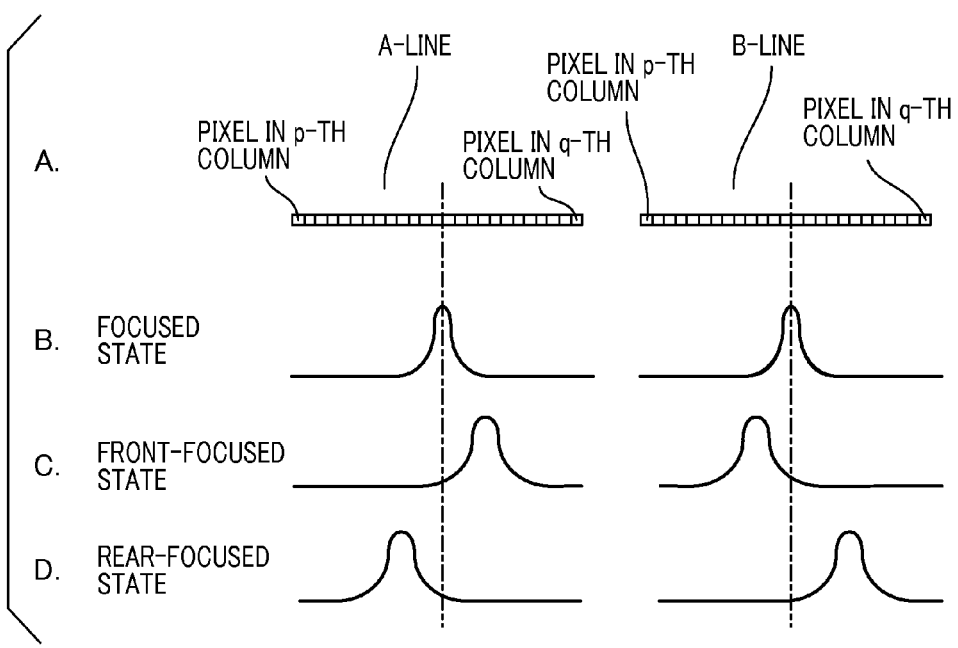
FIGS. 5A to 5D are diagrams illustrating focus detection processing executed by an imaging apparatus.

FIGS. 5A to 5D are diagrams illustrating focus detection processing executed by the imaging apparatus of the present embodiment. FIG. 5A shows a pixel array, in which pixels are arranged in one row in a focus detection calculation region, of an imaging element. The focus detection calculation region is a region through which an image signal used for focus detection calculation is read out. Focus detection calculation is calculation for obtaining the amount of movement of a focus lens, i.e., the amount of focus shift from image data obtained from an imaging element.

FIGS. 5B to 5D show an image at focus positions. FIG. 5B shows a focused state, FIG. 5C shows a front-focused state, and FIG. 5D shows a rear-focused state.

In the imaging element, an A-line pixel and a B-line pixel which receive light passed through different exit pupil regions of an imaging lens are arranged in a two-dimensional array. In the example shown in FIG. 3A, pixels 301L, 302L, 303L, and 304L form an A-line and pixels 301R, 302R, 303R, and 304R form a B-line pixel in a row 305. As shown in FIGS. 5A to 5D, the spacing between an image corresponding to the output of the A-line and an image corresponding to the output of the B-line differs depending on the state of focusing such as a focused state, a front-focused state, or a rear-focused state.

The imaging apparatus is focused by moving the focus lens of the imaging lens such that the spacing between images reaches a spacing in a focused state. In other words, the amount of movement of the focus lens can be calculated from the amount of shift between two images.

Figure 6A:
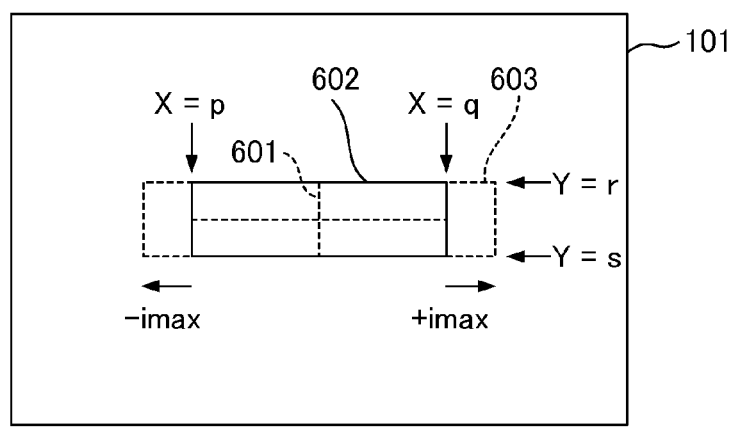
FIGS. 6A and 6B are diagrams illustrating focus detection calculation regions on an imaging element.
Figure 6B:
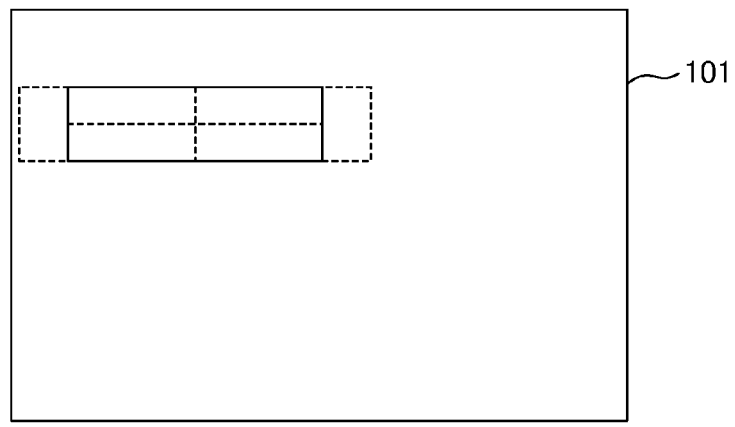

A description will be given of focus detection calculation by calculating the spacing between two images with reference to FIGS. 6A and 6B and FIG. 7. FIGS. 6A and 6B are diagrams illustrating focus detection calculation regions on an imaging element. The focus detection calculation region 602 shown in FIG. 6A is a region in which columns p-q are arranged in the X direction and rows r-s are arranged in the Y direction about the position marked by the reference numeral 601. The shift amount in the focus detection calculation region is from −imax to +imax. The substantial focus detection calculation region is a focus detection calculation region 603 including the shift amount.

FIG. 6B shows a focus detection calculation region which is different from the focus detection calculation region shown in FIG. 6A. The imaging apparatus can perform calculation for focus detection at any location on a screen by shifting the focus detection calculation region as shown in FIG. 6B.

FIG. 7 is a flowchart illustrating an example of focus detection calculation processing. The focus detection calculation processing is executed by the entire control/calculation unit 1309 provided in the imaging apparatus. Firstly, in step S701, the imaging apparatus selects a row r as the first row Y. Next, in step S702, the imaging apparatus sets Iy=−Imax. In this example, since Y is equal to the row r, the image shift amount in the row r is determined. Next, in step S703, the imaging apparatus shifts the pixel data of the B-image by Iy pixels. Next, in step S704, the imaging apparatus determines a correlation value between the A-image and the B-image upon Iy pixel shift. More specifically, a correlation value is calculated by determining the absolute value of difference between images for each pixel of the A-line and the B-line using the following Formula:

$$C(Iy) = \sum_{x=p}^{q} |A_x - B_{x+Iy}| \quad \text{[Formula 1]}$$

Symbols Ax and Bx indicate the outputs of the x-coordinates of the A-line and the B-line, respectively, in a specified row. In other words, symbol C(Iy) indicates the sum of absolute values of differences between the A-line and the B-line when the B-line is shifted by Iy pixels. A correlation value may also be determined by, for example, the following Formula:

$$C(Iy) = \sum_{x=p}^{q} |A_{x+Iy} - B_{x-Iy}| \quad \text{[Formula 2]}$$

In the Formula, not only the B-line data but also the A-line data are simultaneously shifted in opposite directions so as to determine the sum of absolute values of differences. At this time, in step S703, the imaging apparatus shifts image data of the A-line by Iy pixels and shifts image data of the B-line by −Iy pixels.

A correlation value may also be determined using the following Formula for calculating a large pixel value for each pixel instead of using the Formula for calculating the absolute value of difference between the A-line and the B-line.

$$C(Iy) = \sum_{x=p}^{q} \max(A_x, B_{x+Iy}) \quad \text{[Formula 3]}$$

Symbol max(A, B) indicates to select the larger one between A and B. A correlation value can also be determined by calculation for selecting the smaller one between A and B. As described above, the present invention does not particularly limit the method for determining a correlation value in step S704.

Next, in step S705, the imaging apparatus substitutes Iy+1 into Iy (shifts image data by one pixel). In step S706, when Iy is greater than Imax, the process advances to step S707. When Iy is equal to or less than Imax, the processes in steps S703, S704, and S705 are repeated.

When the process advances to step S707, a correlation waveform C(Iy) which is the collection of correlation values for a complete row of Iy from −Imax to +Imax has already been determined.

Next, in step S707, the imaging apparatus substitutes C(Iy)+C(I) into C(I). In step S708, the imaging apparatus substitutes Y+1 into Y. When Y is greater than s in step S709, the process advances to step S710. When Y is not greater than s in step S709, the process returns to step S702. In other words, in step S707, the imaging apparatus repeats processing that generates C(I) by summing C(Iy)s in each row for rows from r to s to thereby determine the correlation waveform C(I), which is obtained by summing up over the entire rows, from the correlation waveform C(Iy) in each row.

In step S710, the imaging apparatus determines the highest correlated I in the correlation waveform C(I) which is obtained by summing up the correlation waveforms C(Iy) over the entire rows.

FIGS. 8A to 8C are diagrams illustrating the relationship between a correlation waveform and focus. As shown in FIGS. 8A to 8C, the correlation waveform C(I) indicates a correlation value between the A-line and the B-line when image data is shifted by the shift amount I. When a correlation value is determined by calculating the sum of absolute values of differences, the shift amount I at a location where the output of the correlation waveform C(I) is the lowest is the highest correlated I.

As shown in FIG. 8A, the highest correlated I, i.e., the shift amount I at a location where the output of the correlation waveform C(I) is the lowest in the correlation waveform C(I) in a focused state is zero. As shown in FIGS. 8B and 8C, an image shift based on a shift amount in a non-focused state is a shift amount I. In other words, the shift amount is equivalent to the image shift amount, and thus, it is contemplated that the shift amount I is equal to the image shift amount I.

In step S710, the imaging apparatus determines the highest correlated I in the correlation waveform C(I) to thereby calculate the image shift amount on the A-line and the B-line in rows from r to s. In step S711, the amount of focus shift L is finally determined by scaling the image shift amount I, and the process ends. Although not illustrated in the accompanying drawings, the lens is moved by the amount of L based on the amount of focus shift L so as to be in a focused state.

Although the image shift amount for focus detection can be calculated through calculation for focus detection described with reference to FIG. 7, an imaging element having color filters needs to take the influence of color filters into consideration. When calculation for focus detection by color is performed by an imaging element having a color filter array in a matrix of two rows and two columns, the flow of calculation shown in FIG. 7 needs to be performed four times by color, resulting in an increase in the amount of calculation processing. In the present invention, signals from pixels having different color filters are mixed in order to reduce the amount of calculation processing and perform calculation for optimum focus detection. Hereinafter, a description will be given of signal mixing with reference to the drawings.

FIGS. 9 to 13 are diagrams illustrating focus detection signal generation processing executed by the imaging apparatus of the present embodiment. Hereinafter, a focus detection signal to be generated is described as a "Y-signal" for ease of explanation. In each of FIGS. 9 to 13, a pixel array in a matrix of eight columns and two rows provided in the imaging element is schematically shown in the upper part of the drawing and (virtual) pixels for outputting a Y-signal are schematically shown in the lower part of the drawing.

First Embodiment

Figure 9:
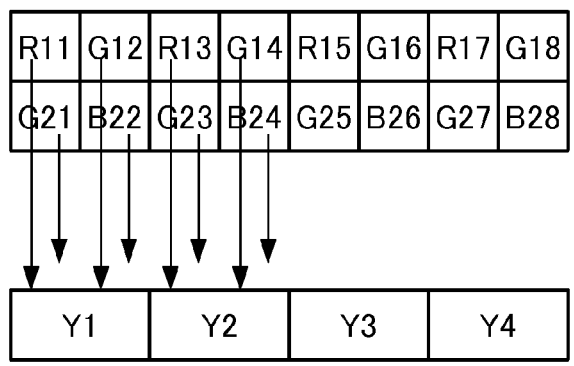
FIG. 9 is a diagram illustrating focus detection signal generation processing.

As shown in FIG. 9, the imaging apparatus of the first embodiment sums or averages pixel signals in a matrix of two rows and two columns to thereby obtain one Y-signal. More specifically, the imaging apparatus sums or averages the output signals from R11, G12, G21, and B22 pixels to thereby obtain a Y-signal Y1. The imaging apparatus performs the same calculation to thereby obtain Y-signals Y2, Y3, and Y4. The imaging apparatus obtains a Y-signal for each A-line and each B-line, and then performs calculation for focus detection described with reference to FIG. 7 based on the obtained Y-signal for the A-line and the obtained Y-signal for the B-line.

In other words, the entire control/calculation unit (hereinafter referred to as "control unit") 1309 of the imaging apparatus functions as a generating unit that generates a signal for phase difference-type focus detection by performing the following processing. The control unit 1309 mixes image signals from pixel portions having different respective color filters for each of a first image signal obtained from the imaging element based on the light flux passed through the first divided region of the exit pupil and a second image signal obtained from the imaging element based on the light flux passed through the second divided region of the exit pupil.

More specifically, the control unit 1309 reads out the two-dimensional first and second image signals in m rows and n columns from the imaging element. The control unit 1309 generates a third image signal in less than m rows by mixing image signals from pixel portions having different color filters for the read first image signal. Also, the control unit 1309 generates a fourth image signal in less than m rows by mixing image signals from pixel portions having different color filters for the read second image signal. In the example shown in FIG. 9, the control unit 1309 averages or sums image signals from a plurality of pixel portions arranged in a row direction and in a column direction for each of the first and second image signals to thereby generate the third and fourth image signals in m/2 rows and n/2 columns.

Then, the control unit 1309 calculates a phase difference between the third image signal and the fourth image signal by comparing image signals included in both the generated third and fourth image signals to thereby perform a focus adjusting operation in accordance with the phase difference obtained by the calculation.

The imaging apparatus of the first embodiment generates a Y-signal corresponding to one pixel from the output signals from pixels in a matrix of two rows and two columns, and then performs calculation for focus detection using the Y-signal, resulting in a reduction in the amount of calculation.

Second Embodiment

Figure 10:
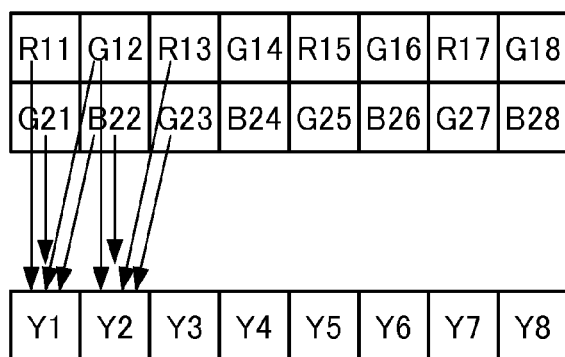
FIG. 10 is a diagram illustrating focus detection signal generation processing.

As shown in FIG. 10, the imaging apparatus of the second embodiment sums or averages the output signals from R11, G12, G21, and B22 pixels to thereby obtain a Y-signal Y1. The imaging apparatus also sums or averages the output signals from G12, R13, B22, and G23 pixels to thereby obtain a Y-signal Y2. As described above, the imaging apparatus of the second embodiment uses the same pixel signals (in FIG. 10, pixel signals G12 and B22) as signals from which a plurality of Y-signals is generated in a duplicate manner.

In other words, in the second embodiment, the control unit 1309 mixes image signals such that the pixel portions which output image signals, from which image signals (e.g., Y1 and Y2) adjacent to one another in the column direction are generated, included in each of Y-signals (third and fourth image signals) are overlapped with each other. In the example shown in FIG. 10, in image signals from which Y1 is generated and image signals from which Y2 is generated, the pixel signal G12 and the pixel signal B22 are used in a duplicate manner. This enables to generate a Y-signal while ensuring sufficient resolution in the horizontal direction. In addition, the imaging apparatus of the second embodiment generates a Y-signal corresponding to one pixel from the output signals of pixels which are adjacent in the row direction, so that the amount of calculation for focus detection can be reduced.

Third Embodiment

Figure 11:
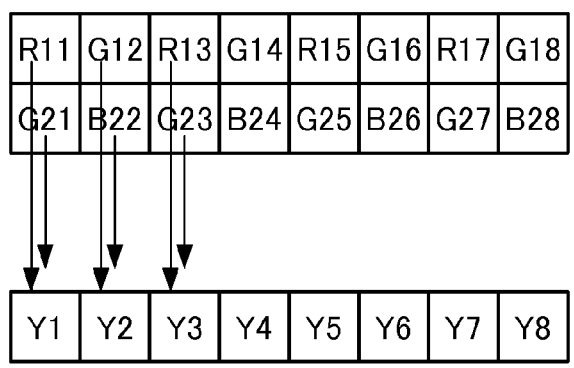
FIG. 11 is a diagram illustrating focus detection signal generation processing.

As shown in FIG. 11, the imaging apparatus of the third embodiment sums or averages the pixel signals R11 and G21 to thereby obtain a Y-signal Y1. The imaging apparatus also sums or averages the pixel signals G12 and B22 to thereby obtain a Y-signal Y2. As described above, the imaging apparatus of the third embodiment averages or sums image signals from a plurality of pixel portions arranged in a row direction for each of the first and second image signals to thereby generate the third and fourth image signals in m/2 rows. This enables to reduce the amount of calculation for focus detection. When the imaging apparatus of the third embodiment determines a correlation value upon calculation for focus detection, the imaging apparatus calculates a correlation value using the following Formula so as not to compare Y1 for the A-line with Y2 for the B-line.

$$C(ly) = \sum_{x=p}^{q} |A_{x+ly} - B_{x-ly}|$$ [Formula 4]

In other words, the control unit 1309 shifts the third image signal and the fourth image signal in opposite directions on a column-by-column basis. In this manner, the third image signal and the fourth image signal for comparison have the same color.

Fourth Embodiment

Figure 12:
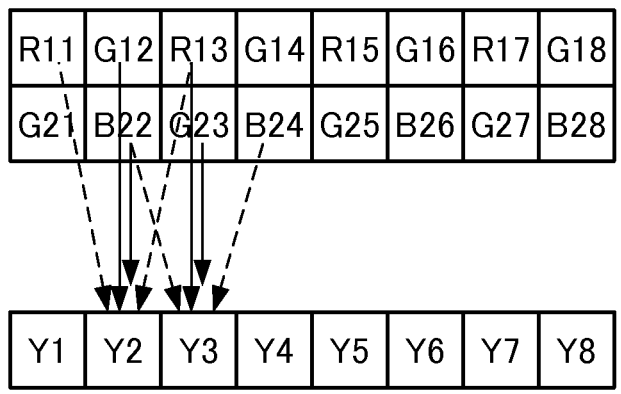
FIG. 12 is a diagram illustrating focus detection signal generation processing.

As shown in FIG. 12, the imaging apparatus of the fourth embodiment sums or averages pixel signals R11, G12, B22, and R13 to thereby obtain a Y-signal Y2. When pixel signals are simply summed up, the influence of a signal from the filter R undesirably increases. Thus, it is more preferable that the imaging apparatus determines Y2 and Y3 through the following summation processing.

(R11+R13)/2+G12+B22=Y2

(B22+B24)/2+R13+G23=Y3

In other words, the control unit 1309 mixes image signals such that the pixel portions which output image signals, from which image signals (e.g., Y2 and Y3) adjacent to one another in the column direction are generated, included in each of Y-signals (third and fourth image signals) are overlapped with each other. In the example shown in FIG. 12, in image signals from which Y2 is generated and image signals from which Y3 is generated, the pixel signal R13 and the pixel signal B22 are used in a duplicate manner.

As described above, the imaging apparatus of the present embodiment generates Y-signals from pixel signals output from the pixel portions in advance of calculation for focus detection, and then performs calculation for focus detection described with reference to FIG. 7. This enables to perform focus detection with a low erroneous detection rate due to the color of the object. When the imaging apparatus has color filters which are arranged in an ordered array in a matrix of two rows and two columns, the imaging apparatus may generates a Y-signal for every second column to thereby perform calculation for focus detection in succession from the generated Y-signal.

In the embodiment described with reference to FIGS. 9 to 12, the imaging apparatus sums and averages signals of adjacent pixels having different color filters to thereby generate a Y-signal, but a method for generating a Y-signal is not limited thereto. For example, the imaging apparatus may weight the filter R, the filter G, and the filter B. More specifically, when the imaging apparatus generates Y1 shown in FIG. 9, weight coefficients $\alpha 1$, $\alpha 2$, $\alpha 3$, and $\alpha 4$ may also change by setting the equation:

$$R11*\alpha 1 + G12*\alpha 2 + G21*\alpha 3 + B22*\alpha 4 = Y1.$$

The imaging apparatus may also change the weight coefficients $\alpha 1$, $\alpha 2$, $\alpha 3$, and $\alpha 4$ depending on the state of the object or the like. For example, the imaging apparatus determines a white balance coefficient based on an image signal from an imaging element, and then changes the weight coefficients $\alpha 1$, $\alpha 2$, $\alpha 3$, and $\alpha 4$ based on the determined white balance coefficient. In this manner, a white balanced Y-signal can be obtained. When the object for which focusing is desired to be made is an object with dark R color, the weight coefficient $\alpha 1$ is set to a large value as compared to the weight coefficients $\alpha 2$, $\alpha 3$, and $\alpha 4$, so that a brightness signal included in the filter R may also deeply be involved in the result of calculation for focus detection.

Figure 13:
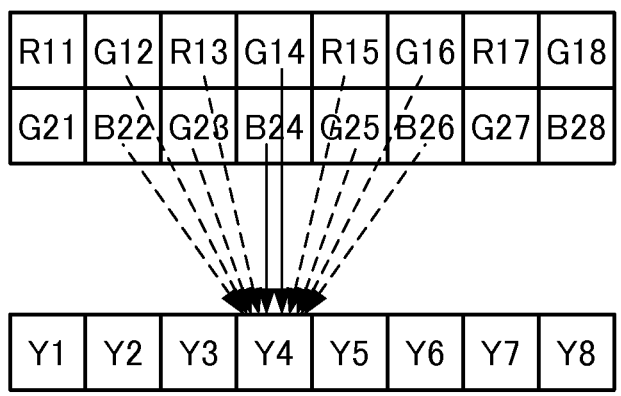
FIG. 13 is a diagram illustrating focus detection signal generation processing.

Furthermore, upon determining a Y-signal, the imaging apparatus may also perform weighting such that the Y-signal is replaced with a typical brightness signal represented by an equation such as $Y=0.299*R+0.587*G+0.114*B$ or the like. The imaging apparatus may also perform weighting such that a high-frequency component is enhanced while filtering signals from peripheral pixels. For example, when the imaging apparatus generates Y4 as shown in FIG. 13, the imaging apparatus may also perform weighting such that a high-frequency component is enhanced by using not only adjacent pixel data but also the next adjacent pixel data for which a specific weighting is fixed.

The imaging apparatus may emphasize a high-frequency component only when the object is in focus and has a high frequency or may also perform simple summation so as not to emphasize a high-frequency component when the object has a low frequency or when the preceding frame is at a position distant from the focusing point. Also, when the imaging apparatus emphasizes a high-frequency component, the imaging apparatus may determine Y-signals for each color filter and then sum up the Y-signals, whereas when the imaging apparatus does not emphasize a high-frequency component, the imaging apparatus may sum up signals from pixels having color filters and then determine a Y-signal.

Figure 14:
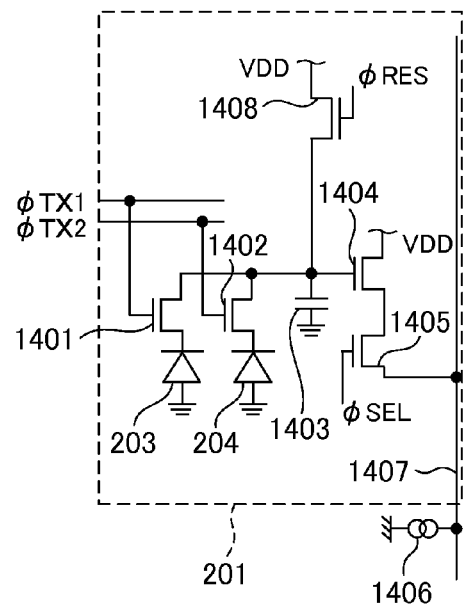
FIG. 14 is a circuit diagram illustrating a configuration of one pixel in an image element.

Here, a further detailed description will be given of driving of the imaging element 1305 and the relationship between Y-signal generation processing and an image signal with reference to FIGS. 9 to 13. FIG. 14 is a schematic circuit diagram illustrating a configuration of one pixel (the pixel portion 201) of the imaging element 1305.

Transfer switches 1401 and 1402 are driven by transfer pulses $\phi$TX1 and $\phi$TX2, respectively, and transfer electric charge generated in the PDs 203 and 204 to a floating diffusion unit 1403 to be described below.

The floating diffusion unit (hereinafter referred to as "FD") 1403 has a role to play as a memory for temporarily accumulating electric charge. A MOS amplifier 1404 functions as a source follower, and a selection switch 1405 selects a pixel by a vertical selection pulse $\phi$SEL. A floating diffusion amplifier is constituted by the FD 1403, the MOS amplifier 1404, and a constant current source 1406 to be described below via a vertical line 1407. Then, the signal electric charge in the pixel selected by the selection switch 1405 is converted into voltage, and the resulting voltage is output to the reading-out circuit 103. A reset switch 1408 receives a reset pulse $\phi$RES to thereby reset the FD 1403 by a power supply voltage VDD. The constant current source 1406 is arranged in each column as in the column circuit.

Figure 15:
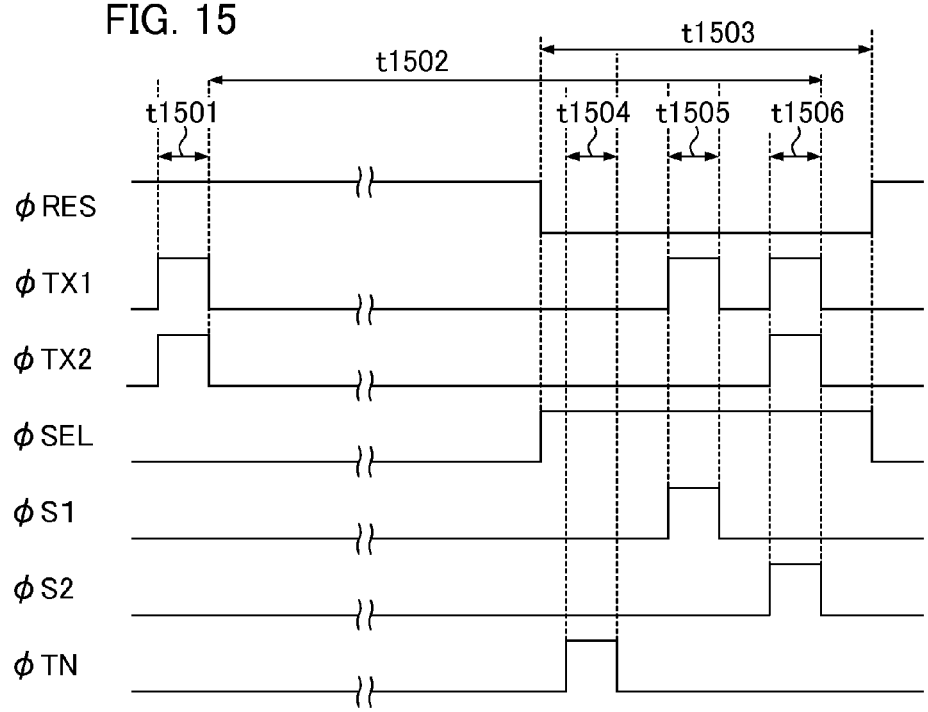
FIG. 15 is a timing chart illustrating a drive pattern of an imaging element according to the present embodiment.

Next, a description will be given of a method for driving the imaging element 1305 having the above configuration. FIG. 15 is a timing chart illustrating a drive pattern of an imaging element and driving for reading signals for one row to the reading-out circuit 103. Firstly, the reset pulse $\phi$RES and the transfer pulses $\phi$TX1 and $\phi$TX2 are simultaneously brought to a high potential (hereinafter referred to as "H") during a time t1501. In this manner, the reset switch 1408 and the transfer switches 1401 and 1402 are turned on and the potential of each of the PD 203, the PD 204, and the FD 1403 is reset to a power supply voltage VDD which is the initial potential. Then, when the transfer pulses $\phi$TX1 and $\phi$TX2 brought to a low potential (hereinafter referred to as "L"), the electric charge accumulation by the PD 203 and the PD 204 starts.

Next, after elapse of a predetermined time determined on the basis of the electric charge accumulation time, the selection pulse $\phi$SEL is brought to H and the selection switch 1405 is turned on during a time t1503, so that an operation for selecting a readout row and reading out signals for one row is performed. At the same time, the reset pulse $\phi$RES is brought to L and the reset of the FD 1403 is released.

During a time t1504, $\phi$TN is brought to H, and the reading-out circuit 103 reads out and records an N signal which is the reset signal of the FD 1403. Although not shown in the drawing, the reading-out circuit 103 reads out the potential of the FD 1403 via the vertical line 1407 based on the control of $\phi$TN, $\phi$S1, and $\phi$S2, and records signals. Next, the transfer pulses $\phi$TX1 and $\phi$S1 are simultaneously brought to H and the transfer switch 1401 is turned on during a time t1505, so that the first PD signal which is the summation signal of a light signal and a noise signal from the PD 203 is recorded in the reading-out circuit 103.

Next, the transfer pulses $\phi$TX1, $\phi$TX2, and $\phi$S2 are simultaneously brought to H and the transfer switches 1401 and 1402 are turned on during a time t1506 while the reset switch 1408 remains off. In this manner, the second PD signal which is the summation signal of a light signal from the PD 203 and a light signal and a noise signal from the PD 204 is recorded in the reading-out circuit 103. Since the transfer pulse $\phi$TX1 is once turned on and a signal from the PD 203 is read out to the FD 1403 during the time t1505, the transfer pulse $\phi$TX1 may be in an off-state during the time t1506. Strictly speaking, the time period from the completion of the time t1501 to the completion of the time t1506 is the time t1502, i.e., the accumulation time. Note that the timing at which the transfer pulse $\phi$TX2 is brought to H and the PD 204 is reset may be delayed by a time difference between the time t1505 and the time t1506.

Based on the N signal, the first PD signal, and the second PD signal read to the reading-out circuit 103 through the aforementioned operation, an A-image signal generated by subtracting the N signal from the first PD signal and a image signal for viewing generated by subtracting the N signal from the second PD signal are output to the outside of the imaging element 1305. The image signal for viewing is a signal of a combination of signals from the PD 203 and the PD 204, and a B-image signal can be generated by subtracting the A-image signal from the image signal for viewing.

Figure 16:
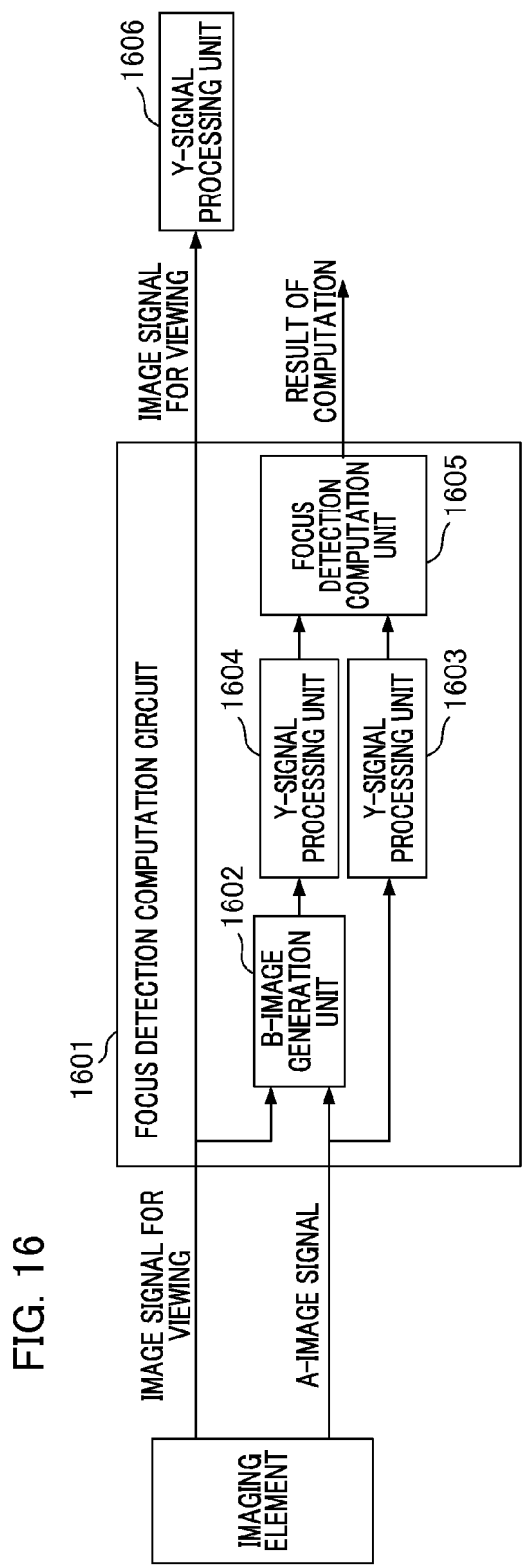
FIG. 16 is a block diagram illustrating a configuration of a system including an imaging element for focus detection.

Next, a description will be given of processing for an image signal for viewing and an image signal for phase difference detection with reference to FIG. 16. FIG. 16 is a block diagram illustrating a configuration of a system including the imaging element 1305 to be used for calculation for focus detection. As described above, an image signal for viewing and an A-image signal are output from the imaging element 1305. Note that an image signal for viewing and an A-image signal may be simultaneously output from the imaging element 1305 or may also be output in a time-series manner. These signals are input to a focus detection calculation circuit 1601. A B-image generation unit 1602 generates a B-image signal by subtracting the A-image signal from the image signal for viewing output from the imaging element 1305.

Next, Y-signal processing units 1603 and 1604 perform processing for generating Y-signals (first signal and second signal) shown in FIGS. 9 to 13 for each of the A-image signal and the B-image signal. Note that a Y-signal for each of the A-image signal and the B-image signal consists of a plurality of unit signals, and each unit signal is a signal obtained by mixing image signals from the same combination of the color filters.

A focus detection calculation unit 1605 performs calculation for focus detection described with reference to FIG. 7. Although Y-signal processing for the A-image signal may be the same as that for the B-image signal, it is preferable that Y-signal processing suitable for viewing is performed to generate a Y-signal for an image signal for viewing. Thus, the image signal for viewing is subject to Y-signal processing by separately provided Y-signal processing unit 1606, so that Y-signals which are different from the A-image signal and the B-image signal used for calculation for focus detection can be generated.

While, in the present embodiment, the B-image signal is generated by subtracting the A-image signal from the image signal for viewing, the A-image signal may also be generated by subtracting the B-image signal from the image signal for viewing, and then each of the A-image signal and the B-image signal may be subject to Y-signal processing to thereby perform calculation for focus detection.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2013-000441 filed on Jan. 7, 2013 and 2013-224217 filed on Oct. 29, 2013, which are hereby incorporated by reference herein in their entirety.

What is claimed is:

1. An imaging apparatus comprising:
    an imaging element including a plurality of pixel portions each having a plurality of photoelectric conversion portions, including an A portion and a B portion, with respect to one micro lens and color filters which are arranged for respective micro lenses, wherein the A portion produces an A pixel signal and the B portion produces a B pixel signal, the imaging element configured to output A pixel signals, and A+B pixel signals each of which is a mixture of the A pixel and the B pixel signal; and
    a generating unit configured to generate B pixel signals based on the A+B pixel signals and the A image signals, and generate a plurality of first pixel signals and a plurality of second pixel signals for phase difference-type focus detection,
    wherein each of the first pixel signals adjacent to each other respectively is generated from at least the same pixel signal obtained from the same A portion and each of the second pixel signals adjacent to each other respectively is generated from at least the same B pixel signal obtained from the same B portion.

2. The imaging apparatus according to claim 1, wherein the plurality of photoelectric conversion portions are configured to generate the A pixel signals and the A+B pixel signals by photoelectrically converting light fluxes passed through different divided regions of an exit pupil of an imaging optical system with respect to one micro lens.

3. The imaging apparatus according to claim 1, wherein each of the A pixel signals and the B pixel signals corresponds to a pixel signal obtained by photoelectrically converting light fluxes passed through different divided regions of an exit pupil of an imaging optical system.

4. The imaging apparatus according to claim 1, wherein the generating unit two-dimensionally reads out the A pixel signals and the A+B pixel signals in m rows and n columns from the imaging element, generates a third pixel signal in less than m rows by combining pixel signals from pixel portions having different color filters for the read A pixel signals, and generates a fourth pixel signal in less than m rows by combining pixel signals from pixel portions having different color filters for the read A+B pixel signals, the generated third and fourth signals corresponding to the first and second signals.

5. The imaging apparatus according to claim 4, wherein the generating unit averages or sums pixel signals from a plurality of pixel portions arranged in a row direction for each of the A pixel signals and B pixel signals to thereby generate the third and fourth pixel signals in m/2 rows.

6. The imaging apparatus according to claim 5, wherein the generating unit averages or sums pixel signals from a plurality of pixel portions arranged in a column direction for each of the A pixel signals and B pixel signals to thereby generate the third and fourth pixel signals in n/2 columns.

7. The imaging apparatus according to claim 4, wherein the generating unit combines the pixel signals for each of the A pixel signals and B pixel signals such that the pixel portions which output pixel signals, from which pixel signals adjacent to one another in the column direction are generated, included in each of the third and fourth pixel signals are overlapped with each other.

8. The imaging apparatus according to claim 1, further comprising:
    a control unit configured to perform phase difference-type focus detection using the first and second pixel signals,
    wherein the control unit shifts the first and second pixel signals in opposite directions on a column-by-column basis.

9. The imaging apparatus according to claim 1, wherein in a case that the combination of the color filters for the plurality of A pixel signals is different from the combination of the color filters for the plurality of B pixel signals, the plurality of A pixel signals and the plurality of B pixel signals have the same color proportion.

10. A method for controlling an imaging apparatus comprising an imaging element including a plurality of pixel portions each having a plurality of photoelectric conversion portions, including an A portion and a B portion, with respect to one micro lens and color filters which are arranged for respective micro lenses, wherein the A portion produces an A pixel signal and the B portion produces a B pixel signal, the imaging element being configured to output A pixel signals, and A+B pixel signals each of which is a mixture of the A pixel signal and the B pixel signal, the method comprising:

generating, by a generating unit, B pixel signals based on the A+B pixel signals and the A pixel signals; and generating, by a generating unit, a plurality of first pixel signals and a plurality of second pixel signals for phase difference-type focus detection, wherein each of the first pixel signals adjacent to each other respectively is generated from at least the same A pixel signal obtained from the same A position and each of the second pixel signals adjacent to each other respectively is generated from at least the same B pixel signal obtained from the same B portion.

\* \* \* \* \*